United States Patent [19]
De Pauw et al.

[11] 3,820,618
[45] June 28, 1974

[54] AXLE ADJUSTING MECHANISM FOR AGRICULTURAL MACHINES

[75] Inventors: Richard A. De Pauw, East Moline, Ill.; Tom G. Stamp, Davenport, Iowa

[73] Assignee: International Harvester Company, Chicago, Ill.

[22] Filed: June 29, 1973

[21] Appl. No.: 375,194

[52] U.S. Cl. .............................. 180/70 R, 280/43
[51] Int. Cl. ......................................... B62d 33/08
[58] Field of Search......... 180/70 R, 88, DIG. 2, 41; 280/43, 6 R, 96.2 A, 111; 56/208, 214; 172/395, 421

[56] References Cited
UNITED STATES PATENTS

| | | | |
|---|---|---|---|
| 1,400,012 | 12/1921 | Bamford | 180/41 |
| 1,423,046 | 7/1922 | Taber | 180/41 |
| 2,532,076 | 11/1950 | Raney et al. | 280/43 |
| 2,760,589 | 8/1956 | Rudman | 180/41 |
| 2,786,541 | 3/1957 | Conrad | 180/41 |
| 2,834,608 | 5/1958 | Wixson | 280/43 |

*Primary Examiner*—Trygve M. Blix
*Assistant Examiner*—Charles E. Frankfort
*Attorney, Agent, or Firm*—F. David AuBuchon; Floyd B. Harman

[57] ABSTRACT

An axle adjusting mechanism for the dual front axle bars and the single rear axle bar of a combine harvester, wherein the ground clearance of the individual axles may be varied by relocating the axle supports on the combine chassis frame. Adjustment of the front axle bars is accomplished by unbolting the gearboxes or casings which carry the wheel drums and hubs from the chassis framework, effecting eccentric adjustments thereof, and then re-bolting the same in such adjusted positions to the framework, thereby changing the elevation of the framework, and consequently the axle bars which are supported thereby. Adjustment of the rear axle bars is carried out in a similar manner by unbolting the rear axle bar support from the chassis framework and raising or lowering such framework, as the case may be, relative to the support and re-bolting it in its adjusted position. Since no gearing is involved, no change in the angularity of the rear axle bar is resorted to. In the case of front axle bar adjustment, one set of bolt holes on each axle bar supporting member is designed for selective mating register with two sets of bolt holes on the chassis framework, while in the case of rear axle adjustment, one set of bolt holes on the chassis framework is designed for selective mating register with two sets of bolt holes on the axle bar supporting member.

8 Claims, 10 Drawing Figures

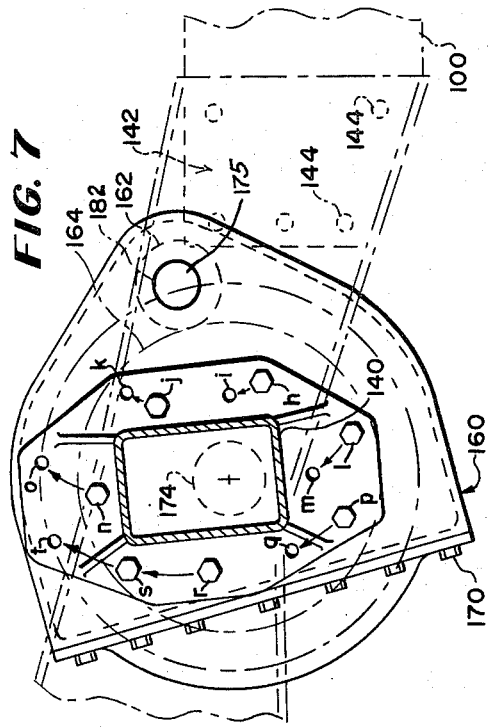
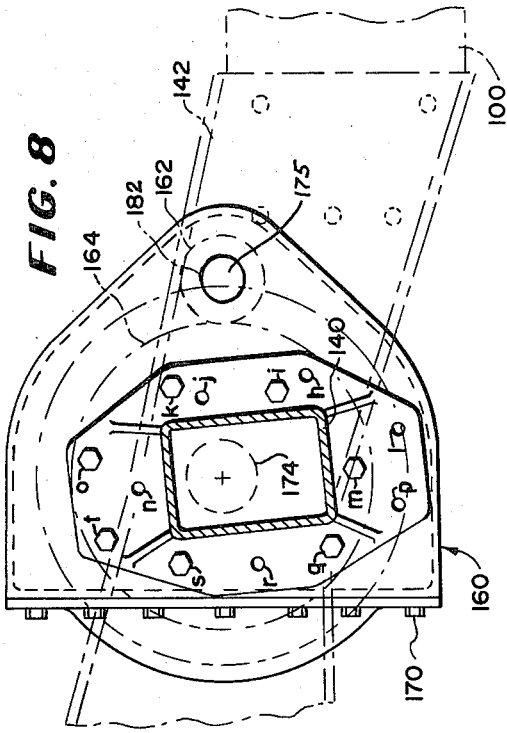
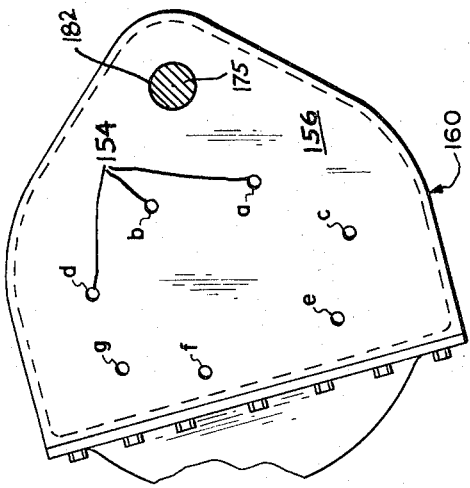

AXLE ADJUSTING MECHANISM FOR AGRICULTURAL MACHINES

The improved axle adjusting mechanism comprising the present invention has been designed for use primarily in connection with harvesting combines of the axial flow type as exemplified in U.S. Pat. No. 3,481,342, granted on Dec. 2, 1969 and entitled AXIAL FLOW TYPE COMBINE. The invention is however, not limited to such combines and, if desired, the invention may, by suitable modification if required, be employed in connection with all manner of harvesting combines, as well as with a wide variety of other agricultural implements.

When a harvesting combine is operated on dry flat land, only a nominal ground clearance for the axle bars thereof is required. On the other hand, when such a combine is operated on soft earth, or when it is obliged to traverse irrigation ditches, levees and the like, an additional clearance for the axle bars is required. The present invention provides a simple and inexpensive means whereby the ground clearance of both the front and rear axles of a harvesting combine may be adjusted, either in the field or in the shop, with a minimum of effort on the part of the operator.

An important feature of the invention resides in the manner in which the ground clearance of the dual axle bars which are invariably associated with conventional combines at the front end thereof may be varied. Such axle bars serve to support individual gearboxes or casings which contain gear and pinion drives for the wheel hubs and drums and therefore it is impractical to effect direct vertical adjustments of the axle bars relative to the chassis framework inasmuch as such vertical shifting of the gearboxes relative to the framework would tend to disable the power trains leading to the wheel hubs.

The present invention affords a means whereby the position of each gearbox which is associated with a respective front axle bar may be altered in such a manner that the alteration not only is tolerated by the design of a conventional gearbox or casing, but also in such a manner that there is no tendency for gear and pinion separation. This means is accomplished by effecting an eccentric angular adjustment of the position of the gear casing about the offset axis of the power input shaft leading to the gearbox, thereby effecting a raising or lowering of the output wheel hub driving shaft relative to the chassis framework. Since the axis of the pinion is coincident with that of the power input shaft, a planetary gearing effect is attained wherein the pinion functions in the manner of a sun gear and the associated drive gear functions in the manner of a planetary gear, thus riding around on the sun gear to a new position while maintaining its full mesh with the pinion.

The provision of a ground clearance adjusting means for the front axle bars of a harvesting combine such as has briefly been outlined above and possessing the stated advantages constitutes the principal object of the present invention.

The provision of such an adjusting means which is extremely simple in its construction and which therefore may be produced at a low cost; one which no additional parts over and above the standard structural components of a conventional harvesting combine; one which may be manufactured as original equipment or applied to existing combines; one which is comprised of a minimum number of relatively moving parts and which therefore is unlikely to get out of order; one which is rugged and durable and will therefore withstand rough usage; and one which, otherwise, is well adapted to perform the services required of it, are further desirable features which have been borne in mind in the production and development of the present invention.

Other objects and advantages of the invention, not at this time enumerated, will become readily apparent as the nature of the invention is better understood.

In the accompanying three sheets of drawings forming a part of this specification, one illustrative embodiment of the invention has been shown.

BRIEF DESCRIPTION OF THE DRAWINGS

FIG. 6 is a fragmentary side elevational view of the left axle bar, together with its associated gearbox or casing and wheel hub and drum arrangement;

FIG. 7 is a sectional view taken substantially on the line 7—7 of FIG. 6 and illustrating a major ground clearance for the axle bar;

FIG. 8 is a sectional view, similar to FIG. 7, illustrating a minor ground clearance for the axle bar;

FIG. 9 is an isolated fragmentary right perspective view of a portion of the chassis framework in the vicinity of the ground clearance adjusting means for the right hand axle bar; and FIG. 10 is a sectional view taken on the line 10—10 of FIG. 6.

Figure 1:
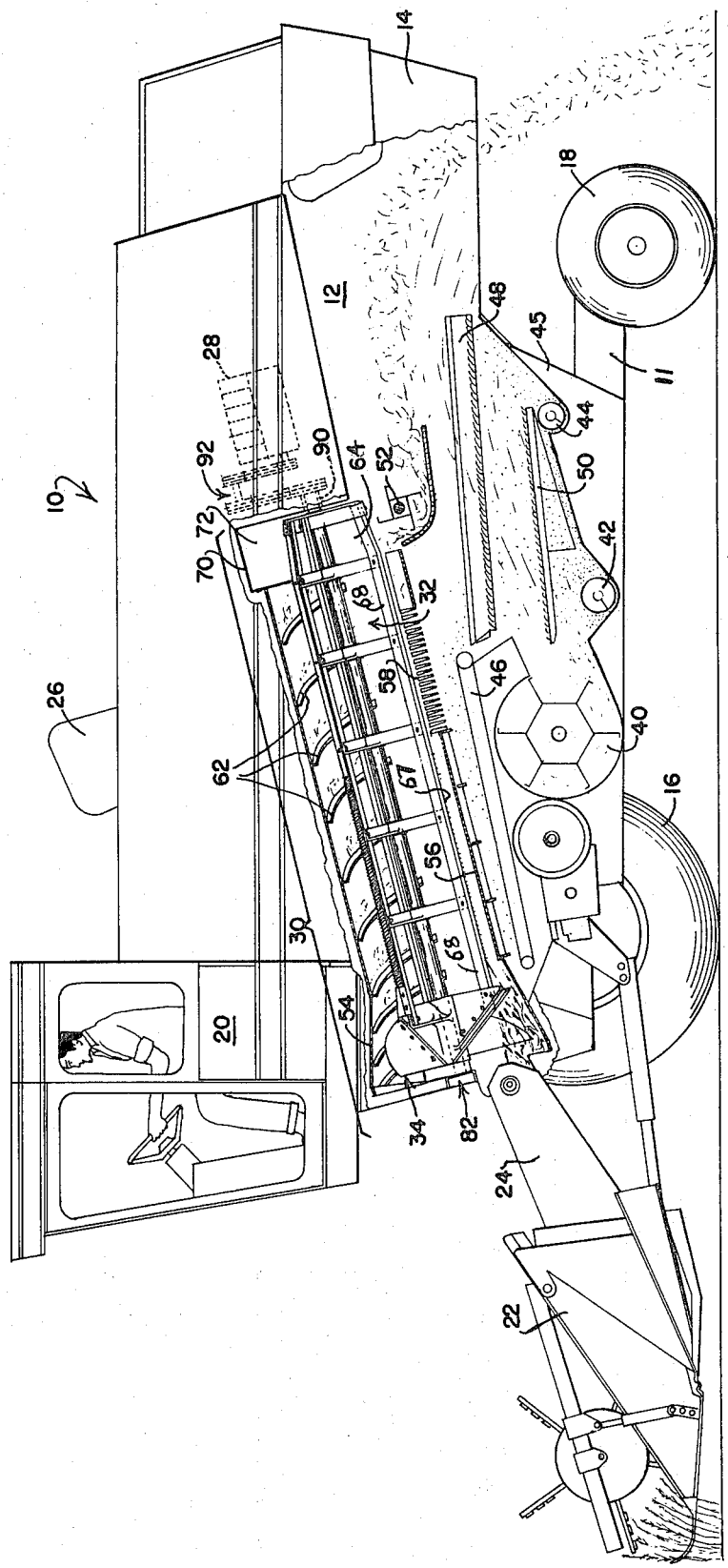
FIG. 1 is a side elevational view of an axial flow-type combine embodying the principles of the present invention, a major portion of one side wall being removed to reveal the crop-gathering means, the crop-feeding means, the crop-impelling means, the axial threshing and separating means, the grain handling and cleaning means, and the crop residue and discharge means.
Figure 2:
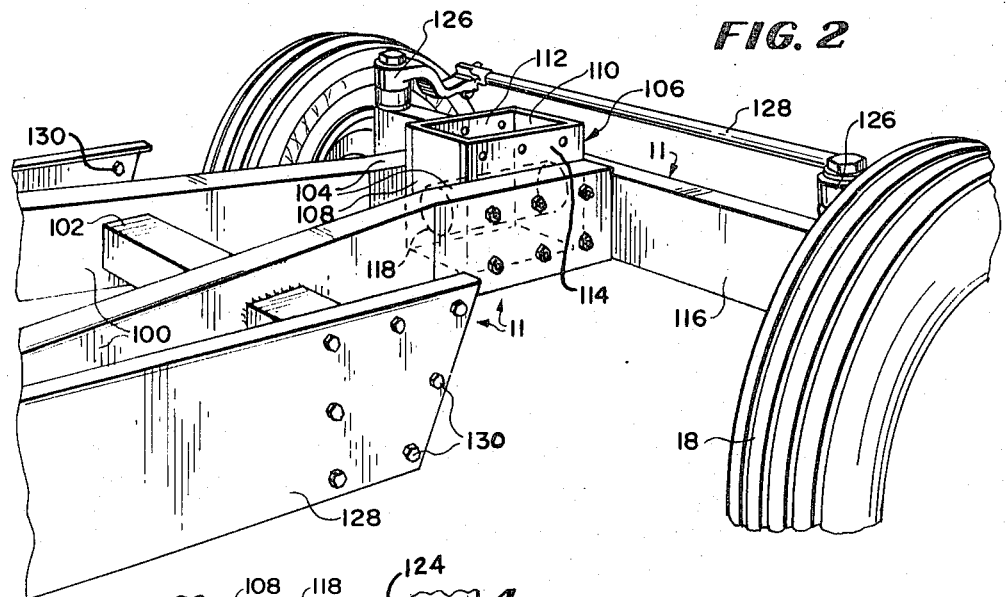
FIG. 2 is an enlarged fragmentary left perspective view of the rear end region of the combine and illustrating the adjusting means whereby the ground clearance for the rear axle bar may be varied.
Figure 3:
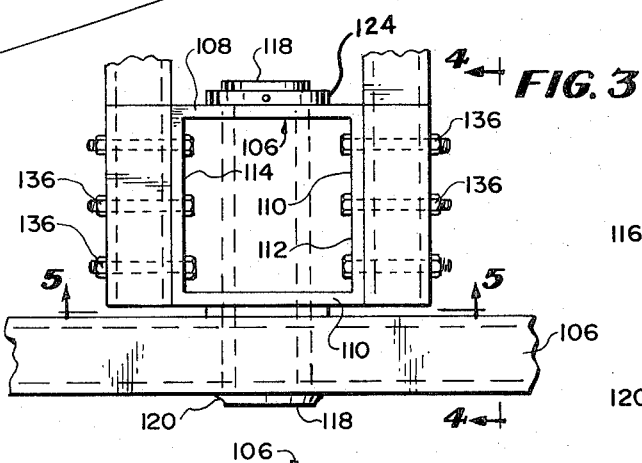
FIG. 3 is a further enlarged fragmentary top plan view of a limited portion of the structure shown in FIG. 2.
Figure 4:
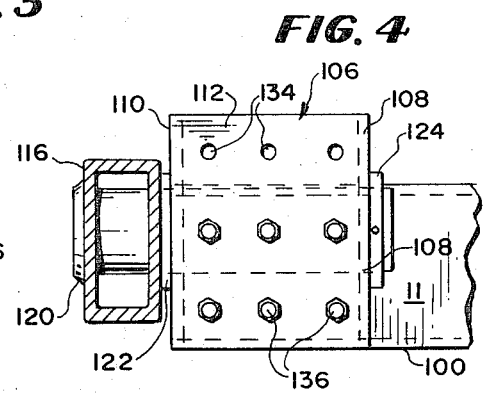
FIG. 4 is a side elevational view of the structure shown in FIG. 3, the view looking in the direction of the arrows associated with the line 4—4.
Figure 5:
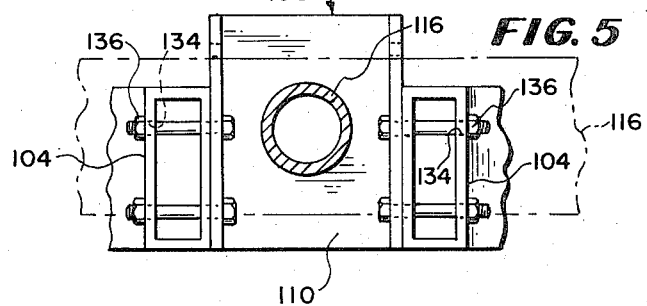
FIG. 5 is an end elevational view of the structure shown in FIG. 3, the view looking in the direction of the arrows associated with the line 5—5.

Referring now to the drawings in detail and in particular to FIG. 1, an axial flow-type combine is designated in its entirety by the reference numeral 10, the combine being of the general type shown and described in the aforementioned U.S. Pat. No. 3,481,342. The combine 10 involves in its general organization a chassis 11 which supports a body portion 12 having vertical side walls 14, the body portion being supported by a pair of relatively large drive wheels 16 in the front region of the combine, and a pair of steerable or dirigible wheels 18 at the rear of the combine. The combine further includes an operator's platform and cab 20, a crop-gathering header 22, a feeder 24, a grain elevator 26 and an engine 28. A grain tank (not shown) is enclosed within the walls of the body portion 12.

As is the case in connection with axial flow-type combines of the character under consideration, the axial threshing and separating means are embodied in a single unit in the form of an elongated and generally cylindrical member 30 in the form of a rotor casing having a rotor 32 mounted therein. The forward end of the rotor 32 carries a vaned impeller 34 of the helix type. Other conventional components not specifically related to the present invention, and which are more or less schematically disclosed herein, are the blower 40, grain auger 42 leading to the aforementioned grain elevator 26, and a tailings auger 44, these components being enclosed within a lower casing section 45 beneath the body portion 12. Enclosed beneath the cylindrical rotor casing and within the body portion 12 is an elongated generally flat endless conveyor 46 which receives separated grain from the concave and grate sections of such member and conducts such grain rearwardly for discharge onto a chaffer sieve 48. Such sieve is reciprocated in a fore and aft direction so as to pass grain and tailings to a grain sieve 50 which also is reciprocated to separate the grain from the tailings so that the grain passes through such sieve and into the grain auger 42 while the tailings are delivered rearwardly to the tailings auger 44. The grain in the auger 42 is delivered by elevator means (not shown) to the grain tank, while the tailings are returned to the rotor casing 30 by elevator means (likewise not shown). A terminal beater 52 which is disposed beneath the rear end of the rotor casing 30 prepares the straw residue for discharge from the combine rearwardly thereof.

Still referring to FIG. 1, the elongated cylindrical rotor casing 30 extends along the longitudinal axis of the combine 10 and the forward end thereof is provided with a frusto-conical transition section 54 which is so termed because it represents a funnel-like entrance mouth by means of which material that is fed rearwardly from the feeder 24 in the form of a relatively wide mat is shrunk, so to speak, and caused to enter the remaining rearward portion of the rotor casing for threshing and separating functions which are performed within the casing upon the material.

The impeller 34 is provided with a vane arrangement which closely mates with the inner frusto-conical surface of the transition section 54. The material which enters the truly cylindrical portion of the casing 30 is processed as it travels forwardly, the threshed grain escaping from the casing through the apertured bottom which is made up of a concave 56 and a grate 58 which define the threshing and separating regions of the casing 30. The straw and other waste material is conducted rearwardly from the separating region of the casing 30 and enters an expansion chamber 72 which exists by reason of a discharge chute 70 which opens downwardly and provides a straw discharge outlet 60 in the lower region of the casing 30 at the extreme rear end thereof. The rotor 30 is journalled for operation within the casing 30 and is provided with an axial rotor shaft 66 which is supported at its forward end in a transverse bar 82 forming a part of the chassis 11. Rotor blades 68 having rasp bars 67 extend longitudinally and are carried on spiders 69 mounted on the rotor shaft 66. Helical transport fins 62 on the upper surface of the casing 30 function to index the material axially through the casing.

The arrangement of parts thus far described is purely conventional and no claim is made herein to any novelty associated with the same, the novelty of the present invention residing rather in the manner in which the ground clearance at both the front and rear of the combine 10 may be adjusted as between major and minor clearance distances.

Considering now the ground clearance adjustment arrangements for the front and rear end regions of the combine 10, the latter is disclosed in FIGS. 2 to 5 inclusive, while the former is disclosed in FIGS. 6 to 10 inclusive.

Insofar as the combine chassis 11 is concerned, only limited portions thereof are disclosed in the schematic representation of FIG. 1 but a more complete disclosure of the chassis appears in the remaining views. Thus, as shown in these latter views, considered collectively, the chassis 11, in the main, embodies the usual quadrilateral framework including longitudinal side frame members 100 of hollow tubular construction, and various intermediate transverse members 102, only one of which appears in FIG. 2. The longitudinal frame members 100 diverge forwardly from the rear region of the combine where they are relatively close to each other, to the front region of the combine where they are relatively far apart. The extreme rear portions of such frame members 100 are turned at wide angles so that they extend in parallelism, the parallel regions 104 thereof being adjustably secured to an open-ended tubular bolting fixture 106 including front and rear transverse walls 108 and 110 side walls 112 and 114.

The box-like bolting fixture 106 serves to yieldingly support a rear axle bar 116 which is of tubular construction, provision being made whereby the axle bar is floatingly supported for dual wheel traction as the combine travels over undulatory ground. Accordingly, a short pivot shaft 118 projects centrally through the front and rear plates 108 and 110 of the bolting fixture, and also through the axle bar 116, the shaft being freely rotatable in the fixture but being welded as indicated at 120 (FIG. 3) to the outside or rear face of the axle bar. A washer 122 is interposed between the axle bar 116 and fixture 106, while a retaining collar 124 is disposed on the shaft 118 immediately outwardly of the rear fixture wall 108. The axle bar 116 carries the dirigible wheels 18 at the opposite end thereof, such wheels having associated therewith the usual king pin arrangements 126 and a connecting steering rod 128. Additional chassis components which bear no relation to the present invention are disclosed in FIG. 2, these consisting of a pair of outrigger frame bars 128 which are secured by bolts 130 to the ends of the transverse member 102.

The box-like bolting fixture 106 has three sets of holes 134 formed in sidewalls 112 and 114. Two sets of holes 134 are formed in the frame regions 104 such that bolts 136 can be inserted through the aligned holes 134 and secured to thus permit the rear axle bar 116 to assume a high or a low relationship with respect to frame 100.

Whereas the clearance adjusting means for the rear end region of the combine is predicated upon what, in effect, amounts to a true vertical shifting of the rear axle bar 116 relative to the combine chassis 11, the front propulsion wheel supports 160 require individual shifting inasmuch as it is not practical to effect relative shifting of the front axle bar 140. Furthermore, due to the fact that each of these propulsion wheels is associated with a power train consisting of mating gears, relative vertical movement between the wheels and their supporting structures would destroy the center-tocenter distance involved between the two adjacent terminal gears in the power train and thus effect gear separation and a discontinuance of the power train. Therefore, according to the present invention, means are provided whereby what amounts to an arcuate adjustment of the position of each wheel support may be effected, the center of curvature of the arc which is involved being coincident with the axis of rotation of the penultimate gear in the power train, all in a manner that will be made clear presently. Inasmuch as the adjusting means for the two front wheels and their respective supporting structures are substantially identical except for their mirror-like reversal both in configuration and placement, a description of one such adjusting means will suffice for the other.

Referring now to FIGS. 7 and 9, the front end of the right side frame member 100, carries a relatively massive supporting plate 142 of Z-shape configuration in transverse cross section which is secured by bolts 144 to the frame member 100. The plate 142 functions as a frame extension and adapter which compensates for the slant of the frame member 100 and establishes a truly longitudinal support for the front axle bar. The supporting plates 142 are formed with vertical slots 146 therein through which the transverse front axle bar 140 projects and within which it is welded as indicated at 148.

The outer end of the axle bar 140 has welded thereto an octagonal mounting flange 150 which, roughly, is of truncated diamond shape in outline and which is provided with two sets of mounting holes therein including a lower set and an upper set, the two sets overlapping each other, which is to say that certain of the holes in the lower set are common to both sets as will be made clear presently. All of the holes in the mounting flange 150 are collectively designated by the reference numeral 152 but identification of the individual holes will subsequently be made by reference to identifying indicia. The two sets of holes 152 are designed for selective register with a third set of tapped holes 154 which are provided in the inner side wall 156 of a generally bell-shaped gear housing 160 within which there is operatively disposed a pinion 162 (FIGS. 7 and 8) which meshes with a relatively large gear 164 which is mounted on a drive shaft 174. The gear housing is of narrow bell-shaped construction and includes an open rim which normally is closed by a rectangular closure plate 168, the latter being secured in position by bolts 170.

The outer side wall 172 of the gear housing 160 is of frusto conical design and a wheel drive shaft 174 (FIG. 6) projects outwardly through the wall 172 and carries at its outer end a wheel drum and hub 176 on which the associated drive wheel 16 is mounted and to which it is secured by bolts 178. A power input shaft 175 extends to the housing 160 through an opening 180 (FIG. 9) which is provided in the frame extension 142 and enters an opening 182 (FIGS. 7 and 8) in the wall 156 of the gear housing.

The arrangement of parts thus far described in connection with the drive mechanism for the front wheel 16 is more or less conventional since, heretofore, bell housing gear boxes similar to the housing 160 and similarly disposed relative to the chassis 11 have been used. The novelty of the present invention, in part, resides in the dual-mounting for such housing which is made possible by the provision of the aforementioned two sets of holes 152 in the mounting flange 150 which, when one set of such holes is employed for mounting purposes maintain the gear housing 160 in the position wherein it is shown in FIG. 7 representing the "high" position of the combine, and when the other set of holes is employed, maintain the gear housing in the position of FIG. 8 representing the "low" position of the combine. It will be understood, of course, that the input shaft 175 not only functions upon rotation to effect driving of the pinion 162 and consequently the wheel drum and hub 176, but it also serves as a pivot shaft for tilting movement of the gear housing bodily as a unit, and that when such tilting takes place, the center-to-center distance between the pinion 162 and drive gear 164 remains the same so that these power train members remain in constant mesh.

Referring now to FIG. 10, the aforementioned tapped holes 154 which are provided in the outer side wall of the gear casing 160 are seven in number and the hole pattern is such that the holes labelled $a$ and $b$ lie on the arc of a circle which is concentric with the axis of the drive shaft 175, the holes labelled $c$ and $d$ lie on an arc further removed from the axis of the shaft, while holes labelled $e$, $f$ and $g$ line on an arc still further removed from such axis. These seven holes are designed for selective register with the ten holes 152 which are formed in the bolting or mounting flange 150 to attain the two positions of the gear casing 150 which are illustrated in FIGS. 7 and 8 respectively. The hole pattern of these ten holes is such that the holes labelled $h$, $i$, $j$ and $k$ lie on the same arc as the holes $a$ and $b$, the holes $l$, $m$, $n$ and $o$ lie on the same arc as the holes $c$ and $d$, while the holes $p$, $q$, $r$, $s$ and $t$ lie on the same arc as the holes $e$, $f$ and $g$.

Considering now the wheel and axle adjustment which is prevalent when the combine is in its upper or raised position as shown in FIG. 7, the seven tapped holes 154 which are provided in the inside wall 150 of the gear casing 160 are in register with seven of the thirteen holes 152 in the mounting flange 150, the registering holes being paired as follows: $h$, $a$; $j$, $b$; $l$, $c$; $n$, $d$; $p$, $e$; $r$, $f$; and $s$, $g$. Bolts 170 extend through the various seven paired holes 152 and 154 and the gear casing 160 assumes the inclined position in which it is shown in FIG. 7 wherein the input shaft 175 assumes an elevated position, thus maintaining the forward end of the frame member 100 and the axle bar 140 elevated correspondingly. It will be understood of course that the substantially identical adjusting arrangement which is associated with the left frame member will be similarly disposed.

When it is necessary to effect lowering of the front end of the combine, this may be accomplished by supporting the front end of the chassis 11 on a suitable jack or the like and adjusting the jack so that the wheels 16 are relieved of their load but are not raised appreciably from the ground. Thereafter the seven bolts 170 are withdrawn so as to free the gear casing 160 and its associated drive shaft 174 and wheel drum 178 from the mounting flange 150. Then, by lowering the jack, the front end of the chassis 11 will become gradually lowered while the gear casing 160 which at this time derives its support from the ground, will rock about the axis of the input shaft 175 and pinion 162 in a clockwise direction as viewed in FIG. 8 until such time as the seven tapped holes 154 in the wall 156 of the gear casing 160 become aligned with a new set of holes 152 in the mounting flange 150. During such rocking movement of the casing 160 the large gear 164 within the casing will travel in orbital fashion throughout a small circumference of the pinion 162, the pinion thus functioning in the manner of a sun gear and the gear 164 functioning in the manner of a planet gear to produce a planetary gearing effect while maintaining full meshing relationship. The holes which thus become paired are as follows: *i, a; k, b; m c; o d; q, e; s, f;* and *t, g*. The seven bolts 170 are then placed in the paired holes and tightened. With the parts in the position just described, and as shown in FIG. 8, when the jack is removed from beneath the front end of the chassis 11, the axle bar 140 will assume the lowered position in which it is shown in this view.

It will be understood that adjustments of the front end of the combine which affect the height of the axle bars 140 on opposite sides of the combine will be properly correlated with adjustment of the rear end of the combine wherein the height of the single rear axle bar 116 (FIG. 2) is varied in the manner previously set forth.

The invention is not to be limited to the exact arrangement of parts shown in the accompanying drawings or described in this specification as various changes in the details of construction may be resorted to without departing from the spirit of the invention. For example, although the invention has been shown and described herein in connection with a harvesting combine of the axial flow type, it is to be distinctly understood that the same is equally well adapted for use in connection with conventional harvesting combines wherein the material to be threshed is fed between a rotary cylinder and a stationary concave in a direction normal to the axis of the rotating cylinder. Furthermore, the invention is not necessarily limited to use with harvesting combines and, if desired, the same may, with or without modification as required, be employed with a wide variety of agricultural machines too numerous to mention. Therefore, only insofar as the invention has particularly been pointed out in the accompanying claims is the same to be limited.

What is claimed is:

1. In an agricultural implement including a chassis, an axle bar rigidly secured to said chassis and having a lateral bolting flange at one end thereof which is formed with a plurality of series of bolt holes therein;

a gearbox having inner and outer side walls, said inner side wall provided with a single series of threaded bolt holes therein, a wheel drive shaft projecting outwardly through said outer wall, a driven input shaft projecting through said inner wall, and extending parallel to said wheel drive shaft, gear means within said gearbox for transmitting rotary motion from said driven input shaft to said wheel drive shaft, said gearbox being capable of angular swinging movement about the axis of said input shaft;

certain of the bolt holes in said bolting flange lying in an arc which is concentric with the axis of the input shaft, whereby upon angular swinging movement of said gearbox about the axis of said input shaft the series of bolt holes in said inner side wall can be aligned with a series of bolt holes in said bolting flange; and a series of fastening bolts which are receivable in a selected series of bolt holes in said bolting flange and in the aligned series of bolt holes in the inner wall of the gearbox.

2. The invention as set forth in claim 1 wherein said gear means comprise a pinion on said driven input shaft and a meshing gear on said wheel drive shaft.

3. The invention as set forth in claim 1 wherein said agricultural implement includes a second axle bar which is adjustably mounted on said chassis in the vertical direction, to thus provide for vertical adjustment of the chassis while maintaining the chassis level.

4. The invention as set forth in claim 2 wherein said agricultural implement includes a second axle bar which is adjustably mounted on said chassis in the vertical direction, to thus provide for vertical adjustment of the chassis while maintaining the chassis level.

5. The invention as set forth in claim 1 wherein certain of the bolt holes in said inner wall of the gearbox lie in an arc which is concentric with the driven input shaft.

6. The invention as set forth in claim 2 wherein certain of the bolt holes in said inner wall of the gearbox lie in an arc which is concentric with the driven input shaft.

7. The invention as set forth in claim 3 wherein certain of the bolt holes in said inner wall of the gearbox lie in an arc which is concentric with the driven input shaft.

8. The invention as set forth in claim 4 wherein certain of the bolt holes in said inner wall of the gearbox lie in an arc which is concentric with the driven input shaft.

* * * * *